Patented Dec. 13, 1932

1,890,851

UNITED STATES PATENT OFFICE

ADOLPH M. HANSON, OF FARIBAULT, MINNESOTA, ASSIGNOR TO PARKE, DAVIS & COMPANY, OF DETROIT, MICHIGAN, A CORPORATION OF MICHIGAN

EXTRACT OF PARATHYROID GLAND AND PROCESS OF PREPARING THE SAME

No Drawing.   Application filed March 30, 1925.   Serial No. 19,541.

The invention of matter derived from the parathyroid glands of mammals and characterized by its physiological effect of increasing the calcium content of the blood when administered hypodermically. The new composition is obtained by extracting the active principle of the parathyroid glands of certain mammals, and while the composition of the active ingredients is not at present definitely known, their presence in the new product can nevertheless be identified by the physiological properties.

The preparation of the extract may be advantageously carried out by utilizing fresh parathyroid glands from cattle, freed from as much fat as possible without removing parts of the glands. The solvent used for the extraction is preferably hot diluted acid such as hydrochloric acid. While various dilutions of acid may be used up to 5% by weight the preferred concentration in the case of hydrochloric acid is 0.4% by weight, which corresponds to 1% by volume, since the best yield is obtained by these proportions. If higher concentrations are used the time of boiling should be correspondingly reduced. As a specific example of a method of preparation, the following procedure may be used.

The fresh bovine parathyroid glands are first macerated and then treated with a diluted hydrochloric acid solution, the following proportions being used.

Glands _____ 30 gms.
Pure distilled water _____ 495 cc.
Concentrated hydrochloric acid (CP)  5 cc.

This mixture is preferably boiled for two hours after which the solution is allowed to cool and is diluted with pure distilled water to 500 cc. The fat is then removed from the solution, first by the ordinary process of skimming and afterwards by a series of filtrations through sterile gauze and finally, through sterile fine mesh filter paper. The filtrate thus obtained contains the active principle of the parathyroid glands and when administered hypodermically to mammals has the effect of raising the calcium content of the blood.

A much more marked rise in the calcium content of the blood may be obtained however by partly neutralizing the acid filtrate to the point where maximum precipitation takes place, filtering off the precipitate and concentrating the filtrate by evaporation. For example, 200 cc. of the hydrochloric acid filtrate obtained as above is treated by adding a solution of sodium hydroxide until the maximum precipitation occurs. The mixture is allowed to stand until the precipitate has settled after which a drop or two more of the sodium hydroxide solution is added to the supernatant liquid. If no further precipitation takes place, the solution is filtered and the filtrate at this point will still be acid to litmus. It is then concentrated by evaporation. The concentrated product when administered to dogs hypodermically produces a greater increase in calcium content of the blood than does the hydrochloric acid extract from which it was prepared.

The product prepared according to the above methods is practically free from calcium but nevertheless it has the property of raising the calcium content of the blood when when injected into mammals such as dogs. The product therefore gives promise of being very valuable in the treatment of human disorders which are attributable to a faulty calcium metabolism, conditions which are probably due to the disfunctioning of the parathyroid glands.

In addition to the solutions obtained by the above mentioned methods, certain other therapeutic products have been obtained having properties which are useful in relieving conditions due to faulty calcium metabolism. For example, a solid product has been obtained by evaporating the hydrochloric acid solution until a mass of the consistency and appearance of beef extract results. This can then be poured into large flat pyrex pans and dried at 80° C. This product, when finely ground in a mortar, is a dark gray or grayish black powder slowly hygroscopic when exposed to the air. The powder may be preserved by keeping in glass stoppered or tightly corked bottles, and when dissolved in boiling distilled water appears to have the same effect in the treatment of diseases as the hydrochloric acid extract from which it was prepared.

Another product has been prepared from the hydrochloric acid extract of parathyroid glands by adding to the solution a 1% solution of phosphotungstic acid until precipitation is complete. After the precipitate has stood for one hour, the supernatant liquid is removed by siphonage and distilled water then added to make up the original bulk, together with a solution of phosphotungstic acid to insure complete precipitation. These steps are then repeated until the supernatant liquid is neutral to litmus, whereupon the remaining liquid not permitting of further siphonage is filtered. The precipitate then appears as a fine paste which can be spread out and dried carefully at 60° C. after which it is ground into a fine powder in a mortar. This product, while it absorbs water, does not dissolve in it and no solvent is at present known. It can however be administered subcutaneously as a suspension in sterile oil and when administered in this manner has been found to relieve conditions due to tetany and certain other diseases.

While all of the various products described above have been found to be useful in the treatment of conditions which are generally attributed to faulty calcium metabolism, it has not as yet been definitely ascertained that all have the effect of increasing the calcium content of the blood. However, in the case of the hydrochloric acid solution first described and the partly neutralized and concentrated solution next described, tests have been made which show conclusively that the blood serum calcium of dogs is raised above the normal value when these solutions are administered hypodermically.

What I claim as my invention is:

1. A new therapeutic product of manufacture containing an extract of mammalian parathyroid glands, said product being substantially free from calcium and characterized by its physiological property of raising the blood serum calcium above its normal value when administered to mammals.

2. A therapeutic product containing an acid extract of mammalian parathyroid glands, said product being substantially free from calcium and being characterized by the physiological property of raising the calcium content of the blood when administered hypodermically to mammals.

3. A therapeutic product containing a hydrochloric acid extract of the parathyroid glands of cattle, said product being substantially free from calcium and being characterized by the physiological property of raising the calcium content of the blood when administered hypodermically to dogs.

4. The process of obtaining a therapeutic extract containing the active principle of parathyroid glands, which consists in hydrolyzing the parathyroid glands with a hot diluted solution of a strong mineral acid, neutralizing the acid solution containing the active principle and concentrating the filtrate.

5. The process of obtaining a therapeutic extract containing the active principle of parathyroid glands, which consists in hydrolyzing the parathyroid glands with a diluted solution of a strong mineral acid at substantially the boiling temperature, neutralizing the acid solution until the maximum precipitation occurs, separating the solution from the solid matter and concentrating the resulting filtrate.

6. The process of obtaining a therapeutic extract containing the active principle of parathyroid glands, which consists in boiling the parathyroid glands in a hydrochloric acid solution having a concentration of approximately 1% by volume, separating the solution from the solid matter, neutralizing the acid solution to the point where maximum precipitation occurs, removing the precipitate and concentrating the filtrate.

In testimony whereof I affix my signature.

ADOLPH M. HANSON.